United States Patent
Kollath et al.

(10) Patent No.: US 6,749,213 B2
(45) Date of Patent: Jun. 15, 2004

(54) DRAWBAR SUPPORT ASSEMBLY

(75) Inventors: Michael Dean Kollath, Cedar Falls, IA (US); Peter Alan Kosmicki, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/254,480

(22) Filed: Sep. 24, 2002

(65) Prior Publication Data

US 2004/0056448 A1 Mar. 25, 2004

(51) Int. Cl.[7] .................................................. B60D 1/30
(52) U.S. Cl. ................................ 280/455.1; 280/479.2; 280/474
(58) Field of Search ........................ 280/479.2, 479.3, 280/444, 455.1, 474, 515; 172/439, 446, 447, 450, 667

(56) References Cited

U.S. PATENT DOCUMENTS

| | | | |
|---|---|---|---|
| 1,469,505 A | * 10/1923 | Giddings | 280/444 |
| 3,627,060 A | 12/1971 | Lemmon | 172/450 |
| 4,116,458 A | * 9/1978 | Berg | 172/450 |
| 4,156,473 A | 5/1979 | Myers et al. | 180/14 R |
| 4,195,704 A | 4/1980 | Bass et al. | 180/14 R |
| 4,515,387 A | * 5/1985 | Schuck | 280/479.2 |
| 4,738,463 A | 4/1988 | Poore et al. | 280/421 |
| 5,201,539 A | * 4/1993 | Mayfield | 280/479.2 |
| 5,217,242 A | 6/1993 | Thomas | 280/482 |
| 5,364,116 A | * 11/1994 | Houle et al. | 280/444 |

OTHER PUBLICATIONS

John Deere, "Tractors–FMO Fundamentals of Machine Operation"; Cover p., ii, and p. 129, 1981.

* cited by examiner

Primary Examiner—Lesley D. Morris
Assistant Examiner—Matthew Luby

(57) ABSTRACT

A vehicle drawbar support assembly for supporting a drawbar pivotally coupled to a frame of the vehicle includes a drawbar support attached to the frame. The support engages and supports an end of the drawbar. A pair of bushing members are mounted to the support on opposite sides of the drawbar. The bushing members are engageable with the drawbar to limit sideways movement of the drawbar. Each bushing has a multiple-sided outer surface, and each bushing has a bore extending therethrough along a bore axis which is offset from a central axis of the bushing. Each bushing is rotatable about the bore axis so that different selected sides are engageable with the drawbar. A pin couples each bushing to the support and is received by the bore of the respective bushing.

8 Claims, 2 Drawing Sheets

DRAWBAR SUPPORT ASSEMBLY

BACKGROUND

The present invention relates to an assembly for supporting a drawbar of a towing vehicle.

It is known to provide a tractor drawbar support with vertical capscrews for limiting a drawbar from sliding from side-to-side under implement side-loads. However, such capscrews cannot completely prevent side-to-side sliding of a drawbar.

SUMMARY

Accordingly, an object of this invention is to provide a tractor drawbar support which completely prevents side-to-side sliding of a drawbar.

These and other objects are achieved by the present invention, wherein a vehicle drawbar support assembly for supporting a drawbar pivotally coupled to a frame of the vehicle includes a drawbar support attached to the frame. The support engages and supports an end of the drawbar. A pair of bushing members are mounted to the support on opposite sides of the drawbar. The bushing members can engage with the drawbar to limit sideways movement of the drawbar. Each bushing has a multiple-sided outer surface, and each bushing has a bore extending therethrough along a bore axis which is offset from a central axis of the bushing. Each bushing is rotatable about the bore axis so that different selected sides can engage with the drawbar. A pin couples each bushing to the support and is received by the bore of the respective bushing.

DETAILED DESCRIPTION

Figure 1:
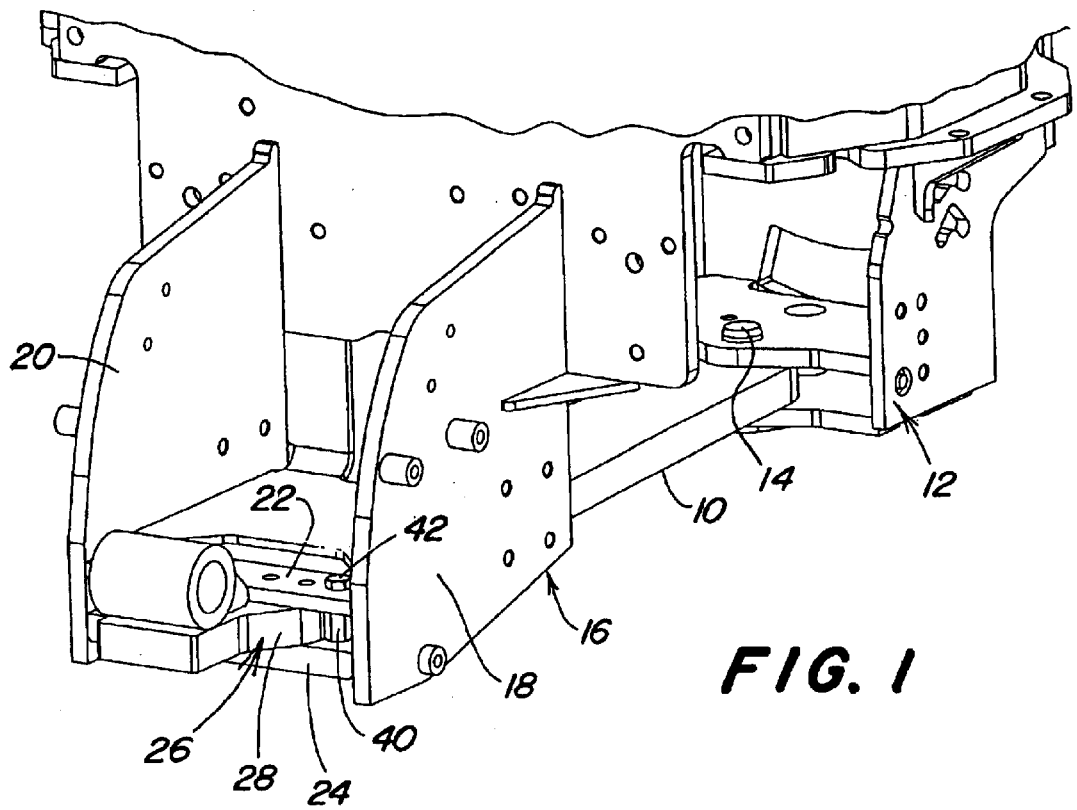
FIG. 1 is a rear perspective view of a drawbar support assembly according to the present invention.
Figure 2:
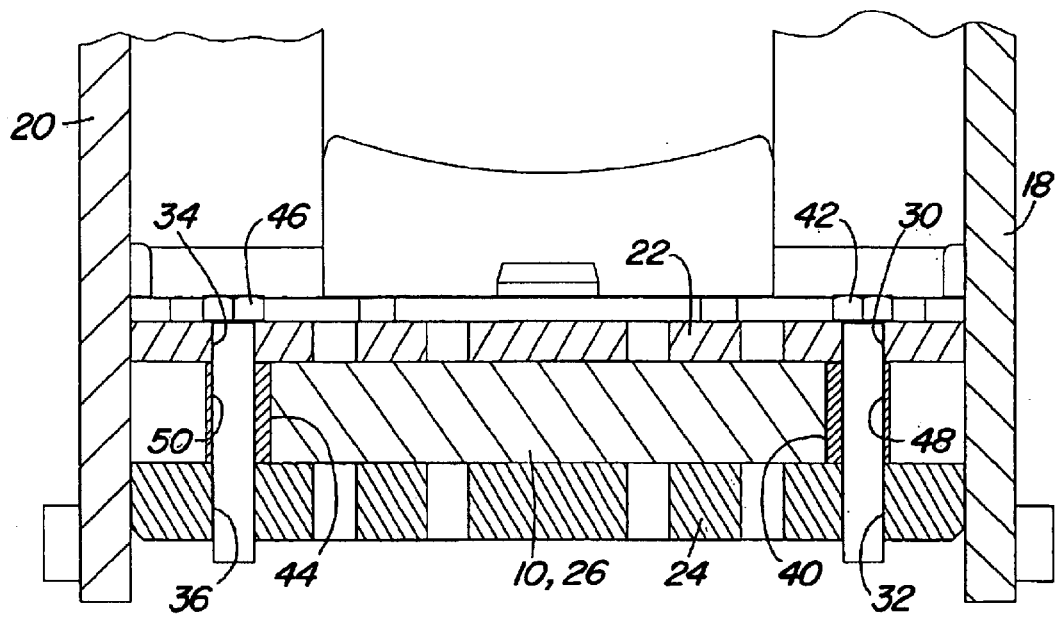
FIG. 2 is a sectional elevation view through a portion of the assembly of FIG. 1.

Referring to FIGS. 1 and 2, a drawbar 10 has a forward end pivotally coupled to a portion of a frame 12 of a vehicle, such as an agricultural tractor, by front drawbar pin 14. A drawbar support 16 is also attached to the frame 12. The support 16 includes right and left side plates 18 and 20. Upper and lower support plates 22 and 24 extend between side plates 18 and 20. Plates 18–24 define a generally rectangular opening 26 which receives an aft end 28 of the drawbar 10.

A pair of vertically extending and aligned right side bores 30, 32 are formed near the right end of plates 22 and 24. A pair of vertically extending and aligned left side bores 34, 36 are formed near the left end of plates 22 and 24. Additional pairs of bores may be arrayed across the plates 22 and 24 as best seen in FIGS. 1 and 2. A right bushing 40 is mounted between plates 22 and 24 between bores 30, 32 and is releasably held in place by pin 42. A left bushing 44 is mounted between plates 22 and 24 between bores 34, 36 and is releasably held in place by pin 46.

Figure 3:
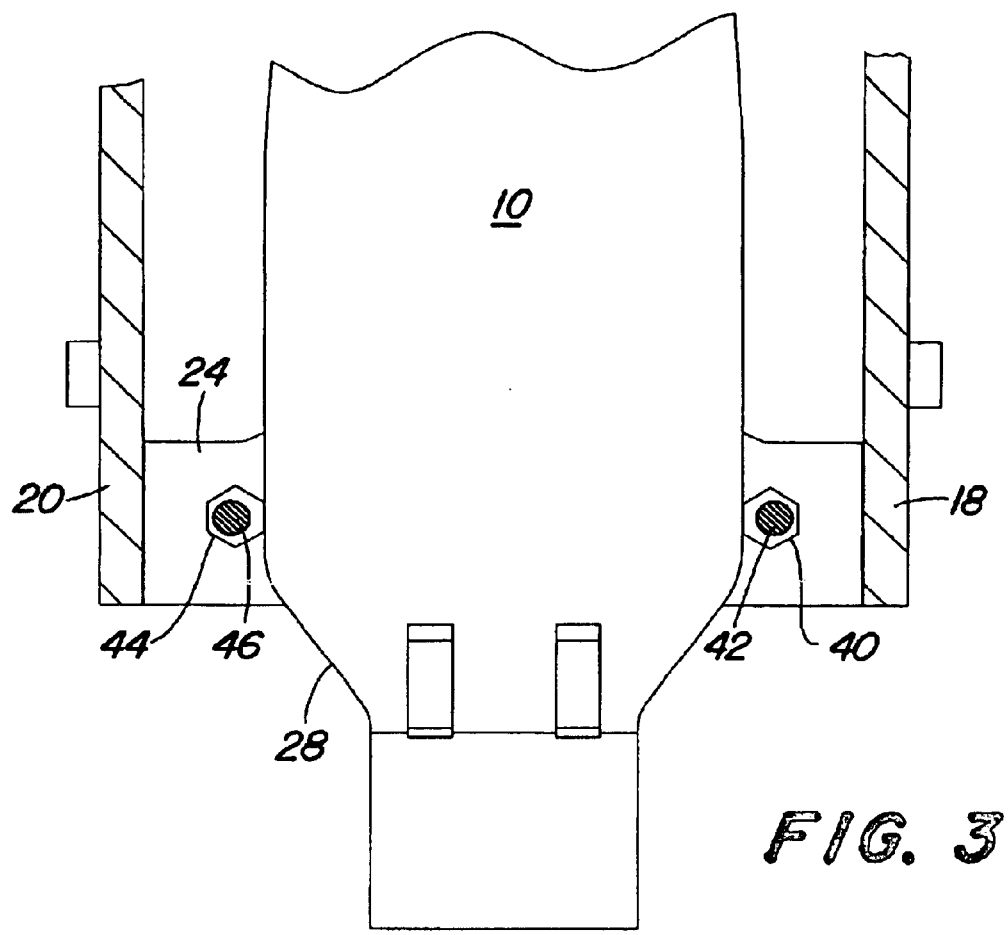
FIG. 3 is top view of a portion of the assembly of FIG. 1 with the upper support plate removed.
Figure 4:
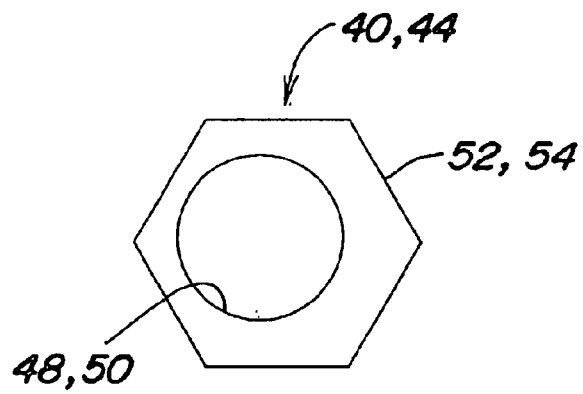
FIG. 4 is an end view of a bushing of FIG. 1.

As best seen in FIGS. 2, 3 and 4, each bushing 40, 44 has a bore 48, 50 extending therethrough, and the bores 48, 50 are offset from a central axis of the corresponding bushing. Each bushing also has a multiple sided outer surface 52, 54, such as a 6-sided hexagonal surface, although other number of sides are possible. When mounted on the pins 42, 46, the bushings 40, 44, can be placed in various rotational orientations and thereby hold the drawbar 10 in various lateral positions between the side plates 18 and 20. The sides of the bushings will engage with the sides of the drawbar 10 and prevent further rotation of the bushings.

While the present invention has been described in conjunction with a specific embodiment, it is understood that many alternatives, modifications and variations will be apparent to those skilled in the art in light of the foregoing description. For example, a pair of bushings could be placed on each side of the drawbar to handle heavier side forces. In addition to a laterally outer pairs of pin bores, various numbers of sets of pin bores, or no additional pairs of pin bores could be formed in the upper and lower support plates. Accordingly, this invention is intended to embrace all such alternatives, modifications and variations which fall within the spirit and scope of the appended claims.

We claim:

1. A drawbar support assembly for a vehicle, comprising:
a drawbar pivotally coupled to a frame of the vehicle;
a drawbar support attached to the frame, the support engaging and supporting an end of the drawbar;
a pair of bushing members mounted to the support on opposite sides of the drawbar, the bushing members being engageable with the drawbar to limit sideways movement of the drawbar, each bushing having a multiple-sided outer surface, each bushing having a bore extending therethrough along a bore axis which is offset from a central axis of the bushing, and each bushing being rotatable about the bore axis so that different selected sides are engageable with the drawbar.

2. The support assembly of claim 1, further comprising:
a pair of pins, each pin coupling a respective one of the bushings to the support and being received by the bore of the respective bushing.

3. The support assembly of claim 1, wherein:
each pin is removably received by the bore of the respective bushing.

4. The support assembly of claim 1, wherein:
the drawbar support comprises an upper support plate and a lower support plate, the drawbar and the bushings being held between the upper and lower support plates.

5. The support assembly of claim 1, wherein:
the drawbar support comprises a right side plate, a left side plate, an upper support plate and a lower support plate, the upper plate and a lower support plate extending between the right and left side plates, the drawbar and the bushings being held between the upper and lower support plates and between the right and left side plates.

6. A drawbar support assembly for a vehicle, the assembly having a drawbar pivotally coupled to a frame of the vehicle, a drawbar support attached to the frame, the support engaging and supporting an end of the drawbar, a pair of bushing members mounted to the support on opposite sides of the drawbar, the bushing members being engageable with the drawbar to limit sideways movement of the drawbar, the improvement wherein:
each bushing has a multiple-sided outer surface, each bushing having a bore extending therethrough along a bore axis which is offset from a central axis of the bushing, and each bushing being rotatable about the bore axis so that different selected sides are engageable with the drawbar.

7. A drawbar support assembly for a vehicle, comprising:

a drawbar support attached to a rear end of the vehicle, the support having a lower laterally extending plate and an upper laterally extending plate positioned above the lower plate;

a first pair of aligned bores extending vertically through the upper and lower plates;

a second pair of aligned bores extending vertically through the upper and lower plates, the second pair of bores being spaced laterally away from the first pair of bores;

a first pin removably received by the first pair of bores;

a second pin removably received by the second pair of bores;

a first sleeve mounted on the first pin between the upper and lower plates;

a second sleeve mounted on the second pin between the upper and lower plates, each of the sleeves having a bore extending therethrough which is offset from a central axis of the sleeve, and each sleeve having a multiple-sided outer surface; and a drawbar received between the upper and lower plates and between the sleeves, a side of each sleeve being engageable with the drawbar.

8. The support assembly of claim 7, wherein:

the first and second pins are removably received by their respective pairs of bores.

* * * * *